United States Patent [19]

Azem

[11] Patent Number: 5,465,297
[45] Date of Patent: Nov. 7, 1995

[54] TELEPHONE LINE SEIZURE CIRCUIT

[75] Inventor: Khaled Azem, Alexandria, Va.

[73] Assignee: Design Tech International Inc., Springfield, Va.

[21] Appl. No.: 208,697

[22] Filed: Mar. 11, 1994

[51] Int. Cl.$^6$ .................................................. H04M 11/00
[52] U.S. Cl. .................. 379/387; 379/377; 379/354; 379/355; 379/382; 379/184; 379/40; 379/45
[58] Field of Search ....................... 379/387, 377, 379/40, 37, 48, 51, 45, 354, 355, 383, 382, 381, 380, 375, 184, 33

[56] References Cited

U.S. PATENT DOCUMENTS

| | | | |
|---|---|---|---|
| 3,582,555 | 6/1971 | Kok | 379/40 |
| 3,626,098 | 12/1971 | Lee | 379/40 |
| 3,715,502 | 2/1973 | Martin | 379/50 |
| 4,152,549 | 5/1979 | Ceruti et al. | 379/387 |
| 4,444,999 | 4/1984 | Sparrevohn | 379/387 |
| 4,558,181 | 12/1985 | Blanchard et al. | 379/40 |
| 4,716,582 | 12/1987 | Blanchard et al. | 379/28 |
| 4,805,210 | 2/1989 | Griffith, Jr. | 379/184 |
| 4,807,278 | 2/1989 | Ross | 379/184 |
| 4,825,465 | 4/1989 | Ryan | 379/184 |
| 4,993,059 | 2/1991 | Smith et al. | 379/39 |
| 5,131,019 | 7/1992 | Sheffer et al. | 379/39 |
| 5,283,816 | 2/1994 | Gomez Diaz | 379/40 |

Primary Examiner—Jeffery A. Hofsass
Assistant Examiner—Jacques M. Saint-Surin
Attorney, Agent, or Firm—Oblon, Spivak, McClelland, Maier & Neustadt

[57] ABSTRACT

The present invention is directed to a telephone line seizure circuit which may find particular application in home security systems which feature an automatic dialer which automatically sends an alarm detection signal out on a telephone line when an alarm condition is detected. The telephone line seizure unit of the present invention operates so that when the automatic alarm dialer is on-hook, the telephone line seizure units are transparent to the telephone system and the telephones can then be used normally. When the automatic alarm dialer goes off-hook, then the telephone line seizure unit operates to disconnect any telephone in use connected thereto, which will thereby allow the automatic alarm dialer to go back on-hook briefly, and after about 30 or so to go off-hook, to thereby utilize the telephone line to send out the alarm detection signal.

11 Claims, 2 Drawing Sheets

TELEPHONE LINE SEIZURE CIRCUIT

DISCUSSION OF THE BACKGROUND

1. Field of the Invention

The present invention is directed to a circuit which can be attached to a telephone line and which can automatically seize a telephone line for an automatic dialing operation.

2. Discussion of the Background

With an increase in crime, the market for home security systems is on the increase. With improvements in wireless security systems, full home alarm systems can be installed by a professional often in less than one hour.

The majority of homes have single telephone line service into the home, which under normal circumstances is more than adequate for phone use. However, when a home owner installs a home security system with a monitoring service which responds to the detection of an alarm situation by automatically dialing a central security monitoring station, then a problem arises. The problem is that if someone in the home is on the phone or the phone was left off-hook, and the security system detects an alarm situation, then the automatic dialer of the security system is not able to dial out since the telephone line is already being used.

One solution for correcting this problem is to simply add a second telephone line to the home. However, such a solution is costly in that an additional telephone line must be installed, and typically the use of the additional telephone line would require a monthly service charge.

Another solution to solving this problem is to add a "line seizure" device in series with the telephone line just before it enters the home. Such a line seizure device will be able to seize the telephone line, i.e., hang up the telephone line, and then redial out to a central security monitoring station. This solution does eliminate the monthly service fees for the operation of the telephone line. However, such conventional line seizure devices which are attached to a telephone line just before it enters the home are expensive and require a dedicated power source. Further, such conventional line seizure devices are hard to install in the average home since the instant the telephone line enters the home the telephone line is split up into a host of parallel lines. The installation of such a conventional line seizure device added to the telephone line just before it enters the home may typically add several hundred dollars to the installation of the home security system.

SUMMARY OF THE INVENTION

Accordingly, one object of the present invention is to provide a telephone line seizure device which is low in cost and which is simple to install.

The present invention achieves these objectives by setting forth a novel telephone line seizure unit which may find particular application in home security systems which feature automatic dialers which automatically send an alarm detection signal out on a telephone line when an alarm condition is detected. A telephone seizure unit of the present invention operates so that when the automatic alarm dialer is on-hook, the telephone line seizure units will be transparent to the telephone system and the telephones can then be operated normally. When the automatic alarm dialer goes off-hook, then the telephone line seizure units of the present invention operate to disconnect any telephone in use connected thereto for a predetermined period of time, which thereby allows the automatic alarm dialer unimpeded access to the telephone lines to send out the alarm detection signal to a central security office.

In this way, the telephone line seizure unit of the present invention can be easily installed between a telephone jack and a telephone, and will automatically seize a telephone line for the automatic alarm dialer.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
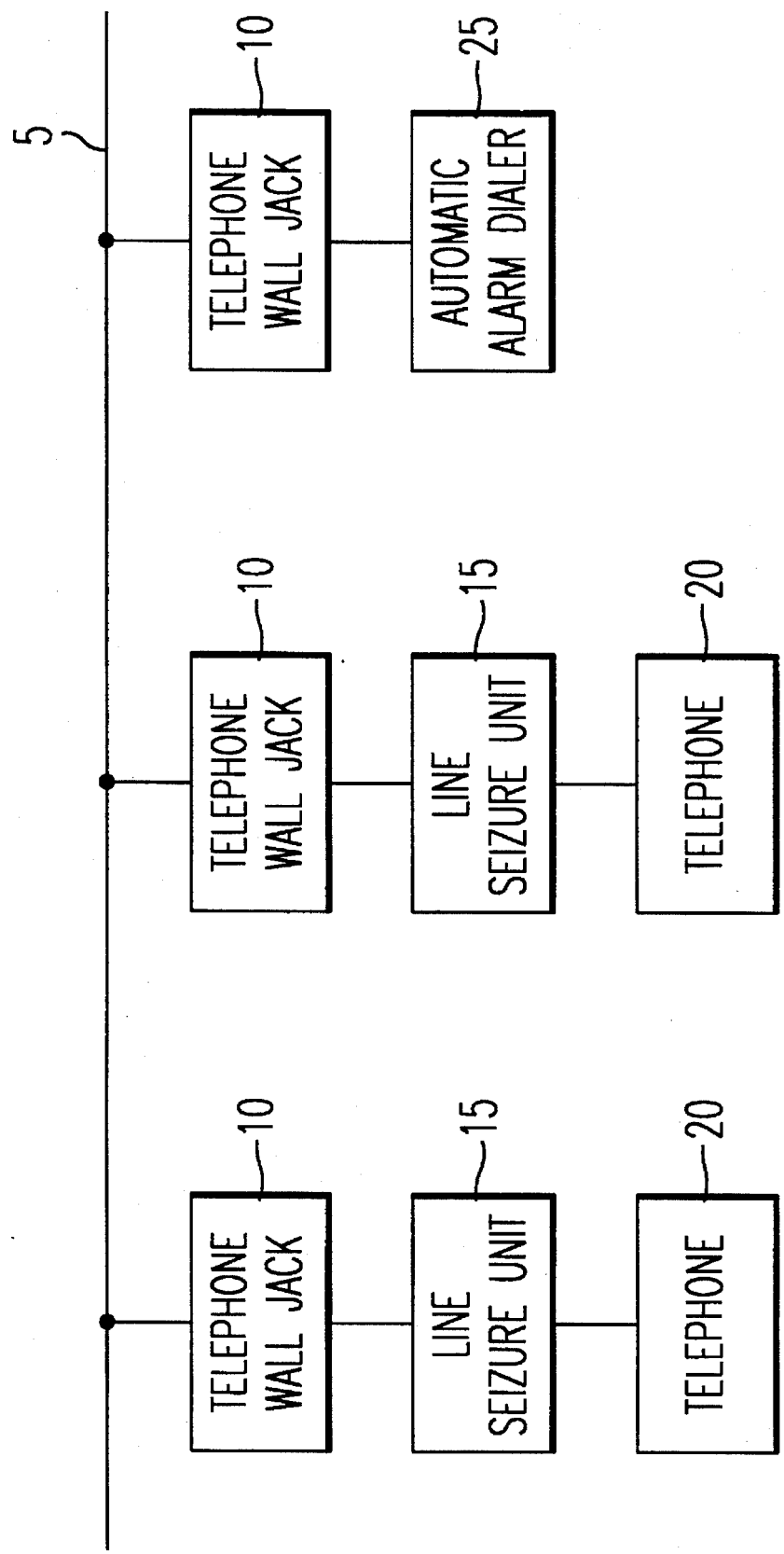
FIG. 1 represents an overall system in which the telephone line seizure unit of the present invention is installed.

Referring now to the drawings, wherein like reference numerals designate identical or corresponding parts throughout the several views, and more particularly to FIG. 1 thereof, there is shown a system in which the present invention can be incorporated. More particularly, the system of the present invention is directed to telephone line seizure units 15, each of which is essentially a small box which plugs into any telephone wall jack 10 so that it is placed between the telephone wall jack 10 and a telephone 20. The telephone unit 20 then plugs directly into the telephone line seizure unit 15.

Preferably, the telephone line seizure unit 15 is powered by the telephone line itself, and thus does not require any batteries or any other power source. Such a telephone line seizure circuit thus has a very simple installation. As is also shown in FIG. 1 of the present specification, an automatic alarm dialer 25 is also connected to a telephone wall jack 10. This automatic alarm dialer 25 operates to automatically dial out on the telephone line 5 when an alarm signal is desired to be transmitted.

The operation of the system of FIG. 1 will now be described. When an alarm signal is activated, the automatic alarm dialer 25 seizes the telephone line 5 if someone is on one of the telephones 20, and thereafter transmits an appropriate alarm signal to a central security monitoring station. This operation occurs such that the automatic alarm dialer 25 first checks to see if the telephone line 5 is in use. If telephone line 5 is not in use, the automatic alarm dialer 25 simply picks up the telephone line 5 through the telephone wall jack 10 connected thereto and dials out the appropriate alarm signal. If the telephone line 5 is in use or was inadvertently left off-hook, then when the automatic alarm dialer 25 picks up the telephone line 5, the telephone line seizure unit 15 will cause the telephone 20 which is being operated and connected thereto to become disconnected. The automatic alarm dialer 25 then hangs up. About 30 seconds after the automatic alarm dialer 25 hangs up the telephone line 5, the party that was-being talked to through telephone 20 will be disconnected to free up telephone line 5, and a few moments later the telephone line 5 is again picked up by the automatic alarm dialer 25 which then dials out its alarm message.

Details of the telephone line seizure units 15 shown in

Figure 2:
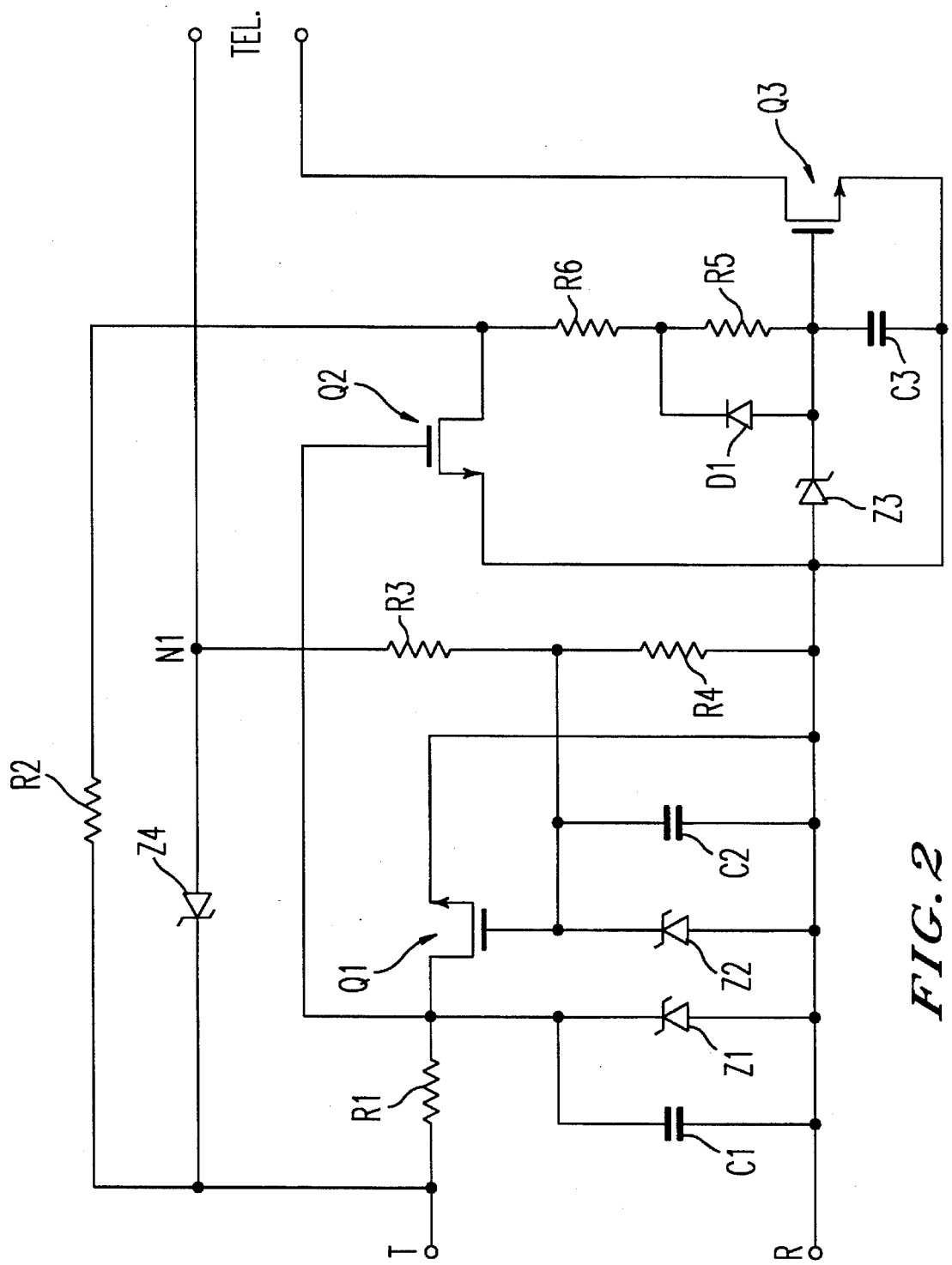
FIG. 2 shows the details of the telephone line seizure unit of the present invention.

FIG. 1 are shown in FIG. 2 of the present specification. As is shown in FIG. 2, the telephone line seizure unit 15 of the present invention has an input T to the tip and an input R to the ring of the telephone line. The telephone line seizure unit 15 of the present invention is a polarity sensitive device, i.e., the device will not operate properly if it is not properly connected to the telephone line. The telephone line seizure unit 15 is designed such that the input at the tip T must have a positive potential in reference to the input at the ring R. This allows the telephone line seizure unit 15 to be powered by the telephone line, and to thereby not require any separate batteries.

As is shown in FIG. 2, the tip T is connected, through a first resistor R1, to a source of a first transistor Q1 and a gate of a second transistor Q2, resistor R1 may typically have a value of 20 mΩ. A parallel circuit of a first Zener diode Z1 and a first capacitor C1 is also connected between the source of the first transistor Q1 and the ring input R. A parallel circuit of a second Zener diode Z2, a second capacitor C2 and a resistor R4 is connected between the gate of the first transistor Q1 and the ring input R. Connected in series with resistor R4 and a node N1, which node N1 is one of the inputs to the telephone 20, is a further resistor R3. Also connected between the node N1 and the tip input T is a further Zener diode Z4. Connected in parallel with the Zener diode Z4, and between the source of the second transistor Q2 and the tip input T, is a further resistor R2. The ring input R is also connected to a gate of a third transistor Q3 through a further Zener diode Z3. The source of third transistor Q3 is also the other input into the telephone 20. Also connected between the source of second transistor Q2 and the gate of the third transistor Q3 are two resistors R5 and R6 in series. Connected between the Zener diode Z3 and a point between the resistors R5 and R6 is a further diode D1. Also, connected between the gate and drain of third transistor Q3 is a further capacitor C3. The drain of the first transistor Q1 and the drain of the second transistor Q2 are also connected to the ring input R.

The operation of the telephone line seizure unit 15 shown in FIG. 2 during normal conditions, i.e., when the alarm dialer 25 is on-hook, will now be described. In this situation, the telephone line voltage on the tip T and ring R inputs can vary from 48V when all the telephone extensions are on-hook to about 18V when one or more telephone extensions are off-hook. In either case, the voltage on node N1 is higher than 5V. It should be noted that the high off-hook voltage of 18V is due to the Zener diode Z4 connected in series with node N1, where the Zener diode Z4 is typically a 12V breakdown voltage Zener diode.

Resistors R3 and R4 form a voltage divider with 5V or higher across the voltage divider. Therefore, the voltage at the gate of first transistor Q1 will be between 2.5V to 5V, when resistors R3 and R4 have the same value, which may typically be 20 mΩ. The upper 5V limit at the gate of transistor Q1 is due to the Zener diode Z2 which in conjunction with capacitor C2 acts as a protection for the gate of first transistor Q1 from high voltages, where the Zener diode Z2 may be a 5V breakdown voltage Zener diode and capacitor C2 has a capacitance of 0.01 μF.

At this point, the first transistor Q1 goes into saturation when the voltage on its gate is 2.5V or higher. When first transistor Q1 is in saturation, i.e., when it is switched on, second transistor Q2 switches off because the voltage at its gate is zero. When transistor Q2 is shut off, capacitor C3 charges through resistors R2, R5 and R6. The voltage on capacitor C3 will be limited by Zener diode Z3, which may typically be a 5V breakdown voltage Zener diode, which acts as an overvoltage protection for both third transistor Q3 and capacitor C3. When the voltage on capacitor C3 reaches the saturation voltage of third transistor Q3, current will flow through the series connection of the telephone set and third transistor Q3, allowing normal operation of the telephone. That is, in this situation when the alarm dialer is on-hook (i.e., when no alarm signal is to be sent out on the telephone line), the line seizure unit 15 allows the telephone 20 connected thereto to operate normally.

When the alarm dialer goes off-hook, i.e., when an alarm situation is detected and the automatic alarm dialer 25 attempts to dial out on telephone line 5 to the central security monitoring station, the following operation takes place. First, the tip T voltage input to the telephone line seizure unit 15 drops to about 9V. As a result, the voltage at the node N1 drops to 0V due to the voltage drop across Zener diode Z4. As a result, the voltage at the gate of first transistor Q1 drops to 0V and first transistor Q1 turns off. Resistor R4 serves as a pull down on the gate of first transistor Q1.

When first transistor Q1 turns off, the voltage at the gate of second transistor Q2 rises to above 5V, causing second transistor Q2 to switch on. The voltage at the gate of second transistor Q2 does not exceed 5V due to Zener diode Z1, which may typically be a 5V breakdown voltage Zener diode, which in conjunction with capacitor C1 acts as a protection for the gate of second transistor Q2 from high voltages; capacitor C1 may typically have a value of 0.1 μF.

When second transistor Q2 switches on, capacitor C3 discharges through diode D1 and resistor R6. When the voltage on capacitor C3 reaches a forward biasing voltage of diode D1, the discharge continues at a slower rate through resistors R5 and R6. When the voltage on the capacitor C3 then reaches the cut-off voltage of third transistor Q3, third transistor Q3 switches off, and then so does the telephone 20 which is connected to the telephone line seizure unit 15. When the telephone 20 connected to the telephone line seizure unit 15 switches off, after about thirty seconds the other party connected to the telephone line will be disconnected, to thereby free up the telephone line 5. Then, after this 30 second time period, automatic alarm dialer 25 can dial out through telephone line 5, and can thereby provide an appropriate alarm signal to the central security monitoring station through the telephone line 5.

Further, the telephone 20 stays switched off until the voltage on capacitor C3 reaches the saturation voltage of transistor Q3, which will only happen if the automatic alarm dialer 25 goes on-hook for a period of time determined by the values of capacitor C3, and resistors R2, R5 and R6. When capacitor C3 is set at a value of 100 μF, and resistor R2=10 mΩ, R5=10 mΩ, and R6=10 kΩ, then this period of time is approximately one minute. This period need only be longer than the time needed for the automatic alarm dialer 25 to hang-up, wait 30 seconds or so, and then pick-up again transmit out an alarm signal on telephone line 5 to the central security monitoring station. It should also be noted that resistor R6 prevents the ring signal R or quick dips in the telephone line voltage from discharging capacitor C3, and thereby inadvertently switching third transistor Q3 off.

In this way, in this operation of the present invention, when the automatic alarm dialer 25 is not in use, i.e., when automatic alarm dialer 25 is on-hook, the telephones 20 connected to the telephone line seizure units 15 will operate normally. However, when the automatic alarm dialer 25 then goes off-hook, i.e., when automatic alarm dialer 25 detects an alarm situation and automatically dials out on telephone line 5 to report the alarm situation to a central security monitoring office, then the telephone line seizure units 15 disconnect the telephones 20 connected thereto. This thereby allows the automatic alarm dialer 25 to go back on-hook to transmit the alarm signals out on telephone line 5.

In the system of the present invention, the automatic alarm dialer 25 should be programmed for the following functions. First, it must determine if the telephone line 5 is in use or not. If the telephone line is not in use, the automatic alarm dialer 25 simply picks up the telephone line 5 and dials out. If the telephone line 5 is in use, the automatic alarm dialer 25 picks up the telephone line and holds it for approximately five seconds. This five second interval should provide enough time for the telephone line seizure units 15 to disconnect any telephones 20 which are in operation. The automatic alarm dialer 25 then hangs up the telephone line 5 and waits for approximately 30 seconds for any party connected to a telephone 20 which is in use to be disconnected. The automatic alarm dialer 25 then picks up the telephone line 5 again, and dials out and then transmits the alarm signal.

As a further feature, the automatic alarm dialer 25 may, just before it picks up the telephone line 5 to dial out the alarm situation, check to determine that no incoming calls have been received, i.e., that no telephones 20 are ringing, and if any telephone is ringing, to wait until the ringing stops before picking up the telephone line to dial out.

The above noted values provided for the circuit elements of the telephone line seizure unit 15 shown in FIG. 2 are merely examples, and it should be apparent to one of ordinary skill in the art that other values for the circuit elements in FIG. 2 can be used. Further, the telephone line seizure unit 15 has been shown as a distinct unit. However, the telephone line seizure unit 15 could be designed to be put into or to be a part of a telephone wall jack, as opposed to being a distinct unit.

Obviously, numerous other modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A telephone line seizure circuit connected between a telephone and a telephone line in which an automatic telephone dialer is connected to the telephone line, comprising:

a first circuit for determining if the automatic telephone dialer is off-hook, wherein the first circuit detects a D.C. voltage level on the telephone line to determine if the automatic telephone dialer is off-hook;

a second circuit for disconnecting the telephone connected to the telephone line seizure circuit when it is determined that the automatic telephone dialer is off-hook, and the second circuit maintaining the telephone connected to the telephone line seizure circuit disconnected for a predetermined period of time until a central office releases the telephone line to which the telephone is connected; and wherein the first circuit and the second circuit are powered from the telephone line.

2. The telephone line seizure circuit according to claim 1, wherein the first circuit comprises a Zener diode connected to the telephone line, the Zener diode having a breakdown voltage greater than a voltage on the telephone line when the automatic telephone dialer is off-hook.

3. The telephone line seizure circuit according to claim 1, wherein the second circuit comprises a transistor connected to the telephone, the transistor turning off when the first circuit determines that the automatic telephone dialer is off-hook.

4. The telephone line seizure circuit according to claim 2, wherein the second circuit comprises a transistor connected between the Zener diode and the telephone, the transistor turning off when the voltage on the telephone line is less than the breakdown voltage of the Zener diode.

5. The telephone line seizure circuit according to claim 1, wherein the telephone line seizure circuit is connected between a telephone wall jack connected to the telephone line and the telephone.

6. A telephone line seizure circuit connected between a telephone and a telephone line in which an automatic telephone dialer is connected to the telephone line, comprising:

means for determining if the automatic telephone dialer is off-hook by detecting a D.C. voltage level on the telephone line to determine if the automatic telephone dialer is offhook; and means for disconnecting the telephone connected to the telephone line seizure circuit when it is determined that the automatic telephone dialer is off-hook and maintaining the telephone connected to the telephone line seizure circuit disconnected for a predetermined period of time until a central office releases the telephone line to which the telephone is connected; and wherein the means for determining if the automatic telephone dialer is off-hook and means for disconnecting the telephone connected to the telephone line seizure circuit are powered from the telephone line.

7. The telephone line seizure circuit according to claim 6, wherein the means for determining if the automatic telephone dialer is off-hook comprises a Zener diode connected to the telephone line, the Zener diode having a breakdown voltage greater than a voltage on the telephone line when the automatic telephone dialer is off-hook.

8. The telephone line seizure circuit according to claim 6, wherein the means for disconnecting the telephone connected to the telephone line seizure circuit when it is determined that the automatic telephone dialer is off-hook comprises a transistor connected to the telephone, the transistor turning off when the means for determining if the automatic telephone dialer is off-hook determines that the automatic telephone dialer is off-hook.

9. The telephone line seizure circuit according to claim 7, wherein the means for disconnecting the telephone connected to the telephone line seizure circuit when it is determined that the automatic telephone dialer is off-hook comprises a transistor connected between the Zener diode and the telephone, the transistor turning off when the voltage on the telephone line is less than the breakdown voltage of the Zener diode.

10. The telephone line seizure circuit according to claim 6, wherein the telephone line seizure circuit is connected between a telephone wall jack connected to the telephone line and the telephone.

11. A method for seizing a telephone line connected between a telephone and a telephone line in which an automatic telephone dialer is connected to the telephone line, comprising the steps of:
  determining if the automatic telephone dialer is off-hook by detecting a D.C. voltage level on the telephone line to determine if the automatic telephone dialer is off-hook; and
  disconnecting the telephone connected to the telephone line seizure circuit when it is determined that the automatic telephone dialer is off-hook and maintaining the telephone connected to the telephone line seizure circuit disconnected for a predetermined period of time until a central office releases the telephone line to which the telephone is connected.

* * * * *